US006958850B2

(12) United States Patent
Sane et al.

(10) Patent No.: US 6,958,850 B2
(45) Date of Patent: Oct. 25, 2005

(54) POINTING ANGLE CONTROL OF ELECTROSTATIC MICRO MIRRORS WITH MODIFIED SLIDING MODE CONTROL ALGORITHM FOR PRECISION CONTROL

(75) Inventors: Harshad Shrikrishna Sane, Burlington, MA (US); Navid Yazdi, Wilmington, MA (US); Carlos Horacio Mastrangelo, Andover, MA (US)

(73) Assignee: Corning Incorporated, Corning, NY (US)

( * ) Notice: Subject to any disclaimer, the term of this patent is extended or adjusted under 35 U.S.C. 154(b) by 75 days.

(21) Appl. No.: 10/262,515

(22) Filed: Oct. 1, 2002

(65) Prior Publication Data

US 2003/0174376 A1 Sep. 18, 2003

Related U.S. Application Data

(63) Continuation-in-part of application No. 10/096,457, filed on Mar. 12, 2002.

(51) Int. Cl.[7] .............................................. G02F 1/29
(52) U.S. Cl. ...................... 359/298; 359/290; 359/292; 359/295; 359/224; 359/230
(58) Field of Search ................................. 359/214, 223, 359/224, 230, 290, 291, 292, 295, 298, 222; 73/504.2, 504.12, 504.09, 504.17; 427/162, 534; 372/19, 20, 45

(56) References Cited

U.S. PATENT DOCUMENTS

| 5,266,115 A | | 11/1993 | Taccon et al. |
| 5,285,379 A | * | 2/1994 | Gamble ........................ 700/40 |
| 5,331,265 A | | 7/1994 | Torii et al. |

(Continued)

OTHER PUBLICATIONS

Decarlo et al., "Variable Structure Control of Nonlinear Multivariable Systems: A Tutorial", Proceedings of the IEEE, 1988, pp. 212–232, 76(3).

Hung, "Variable Structure Control: A Survey", IEEE Transactions on Industrial Electronics, 1993, pp. 2–22, 1993, 40(1).

Yang et al., "Electrostatic Suspension System With Sliding Mode Control", IEEE Transactions on Aerospace and Electronic Systems, 1992, pp. 605–609, 28(2).

Young, et al., "A Control Engineer's Guide to Sliding Mode Control", IEEE Transactions on Control Systems Technology, 1999, pp. 328–342, 7(3).

*Primary Examiner*—Hung Xuan Dang
*Assistant Examiner*—Tuyen Tra
(74) *Attorney, Agent, or Firm*—Wilmer Cutler Pickering Hale and Dorr LLP

(57) ABSTRACT

The present invention is directed to a control system for a MEMS device, such as a MEMS mirror, that uses sliding mode analysis to accurately and predictably control the position of the mirrors in a MEMS device. The present invention also uses the capacitance of the mirror to detect the position of the mirror. In one embodiment, a MEMS mirror device mounted on a substrate is described that includes, a micro mirror that is pivotable about an axis, a first conductive layer on the mirror, a second conductive layer on the substrate, the first and second conductive layers form a first capacitor for determining the position of the mirror. The sliding mode control can be implemented using various drive mechanisms, including electrostatic drives. When used with electrostatic drives, conductive layers that create the capacitors can also be used to drive the mirror. The detection-drive system can be time multiplexed to simplify implementation and to avoid cross talk. An application Specific Integrated Circuit (ASIC) can be used to control the detection and drive of the mirrors.

17 Claims, 12 Drawing Sheets

U.S. PATENT DOCUMENTS

| | | |
|---|---|---|
| 5,341,078 A | 8/1994 | Torii et al. |
| 5,371,669 A | 12/1994 | Venkataraman et al. |
| 5,384,525 A | 1/1995 | Kato |
| 5,388,041 A | 2/1995 | Carpita |
| 5,442,270 A | 8/1995 | Tetsuaki |
| 5,969,465 A | 10/1999 | Neukermans et al. |
| 6,044,705 A | 4/2000 | Neukermans et al. |
| 6,046,878 A | 4/2000 | Liu et al. |
| 6,185,467 B1 | 2/2001 | Romano et al. |
| 6,275,326 B1 | 8/2001 | Bhalla et al. |
| 6,480,645 B1 | 11/2002 | Peale et al. |
| 6,538,802 B2 | 3/2003 | Wang et al. |
| 6,543,286 B2 * | 4/2003 | Garverick et al. ........ 73/514.18 |
| 2002/0176657 A1 | 11/2002 | Burke et al. |
| 2003/0184844 A1 | 10/2003 | Yazdi et al. |
| 2003/0185496 A1 * | 10/2003 | Tremaine ..................... 385/18 |

* cited by examiner

POINTING ANGLE CONTROL OF ELECTROSTATIC MICRO MIRRORS WITH MODIFIED SLIDING MODE CONTROL ALGORITHM FOR PRECISION CONTROL

RELATED APPLICATION

This application is related to earlier filed application U.S. patent application Ser. No. 10/096,457, filed Mar. 13, 2002, the entire contents of which is incorporated by reference into this application.

BACKGROUND OF THE INVENTION

1. Field of the Invention

The present invention relates generally to microelectromechanical (MEMS) devices and in particular to MEMS micro mirrors and a method for controlling the angle of deflection of a micro mirror.

2. Description of Related Art

FIG. 1 illustrates a mirror-in-frame design of a mirror pixel device 10. The device incorporates a mirror 12 which is supported by a frame 14 that forms gimbal structure 16. The device includes a pair of pivots 18, 20, one each for enabling movement in each axis of rotation. The pivots may include torsional springs that provide a restoring force for the mirror plate in a desired position. The position of the mirror is determined by the angle of the mirror within the frame and the angle of the frame with respect to the support of the gimbaled structure. The term position detection of the mirror as used in the specification should be interpreted to include both mirror and frame where appropriate.

The mirror and frame may include one or more thin electrode(s) on its surface. As shown in FIG. 1, the mirror has two electrodes 12a one on each lateral side of the pivot 18. The frame has two electrodes 14a one on each lateral side of the pivot 20. The mirror may be constructed of silicon. The electrode cooperates with an electrode on the surface of a substrate (not shown) and will move the mirror in response to the imposition of a voltage charge between the plates. Various designs have been proposed with more than one electrode on each of the mirror and frame. A pivot spring is typically used to urge the mirror back to a resting position once the charge is discontinued. Often, the mirrors are arranged in arrays with approximately 16 mirrors by 16 mirrors. Depending on any particular application, more or fewer mirrors can be arranged in an array.

The MEMS mirrors can be batch fabricated in a high density array configuration within a few micrometers of tolerance. The mirrors are typically moved along the pivots by electrostatic, electromagnetic, piezoelectric actuation, stepper motors, or thermal bimorphs. The MEMS mirrors can be used to steer a light beam in free space. Optical switches, for example, use MEMS mirrors to steer light into a desired direction. In optical switching applications the beam pointing stability is an important parameter that affects the overall system performance. If the pointing angle stability is not sufficient, significant losses, such as port-to-port losses, can occur and the overall performance may be compromised. Achieving a high-precision stable performance typically requires a servo system that can accommodate system noise and uncertainties.

Achieving a highly stable micro mirror has typically required a servo system that controls the actuation of the micro mirror and a control system to control the mirror deflection. Optical feedback control is one type of control system that has been proposed. This type of control system uses the telecommunication beam in an optical switch and the mirror is controlled by maximizing the optical power of a collimated optical beam reflected from the mirror and received in an optical fiber with photo tabs. Other example of optical feedback control uses a Position Sensing Detector (PSD) or a CCD camera to detect the position of a light beam reflected from the mirror.

Another control system that has been proposed includes adding piezoresistive deflection sensors to the suspension pivot beams of the inner mirror and the outer frame. The output of the angle sensors is a measure of deflection around the two axes of rotation and is used to control the servo mechanisms that control the angle of deflection of the mirror. One drawback to the use of piezoresistive angle sensors are temperature sensitive and require additional connections between the substrate and the control system. Additionally, a device that includes piezoresistive angle sensors may be more complicated and more difficult to manufacturing. Further, each of the above mentioned control systems add to the level of complexity and cost of a MEMS device. The control systems also occupy space and require additional connections between the MEMS device and the control system.

The area of study in which control systems are developed and analyzed is called motion control. Motion control theory has developed sophisticated analyses to define motion control systems which can be adapted to a closed feed back control system. The theory of Variable Structure Control (VSC) uses conventional control techniques and the response of a closed loop feedback system is determined by the control system in combination with the apparatus under control. Changes in the characteristics of the apparatus or disturbance forces acting on it will alter the dynamic response of the system and has limited the application of VSC systems. One subclass of VSC systems which does not have these disadvantages is Sliding mode (SLM) control. SLM control has the advantage that the response to the closed loop system is defined by parameters in the controller and is independent of both changes in the controlled apparatus and disturbances acting upon it.

SLM and VSC control systems are defined using phase space diagrams. The response of any system can be completely described by plotting the phase variables on a phase space diagram. The phase variables consist of the variable of interest (position) and its derivatives (velocity and acceleration). The number of states, or derivatives, required is determined by the order of the plant. For a second order position control system, a step change in control input produces a step change in acceleration and the dynamics of the plant are completely defined the position and velocity. Thus the phase space has two dimensions with position and velocity as the x and y axes. For position control of the third order, a step change in the control input causes a step change in jerk (the rate of change of acceleration). The phase space thus has three dimensions with the axes being position, velocity and acceleration. Sliding mode control has been used in devices such as compact disk drives and other areas.

Sliding mode control is an effective control technique that achieves precision tracking control and, in addition, yields considerable stability and performance robustness even with parameter changes and noise. SMC is desirable because it is regarded as simple and easily implemented. Simply, SMC uses a high frequency digital control that switches between two predetermined values of control inputs, e.g., on/off or +V/−V, on the basis of the error between the desired value, i.e., set point, of a performance output signal and its actual value. Specifically, the digital control signal switches on the basis of a sign of a certain function of the error and its derivatives. This function is referred to as the sliding mode function or simply sliding mode, and is the sum of the error signal and amplified derivative of the error signal. The amplification gain for the derivative is referred to as the differential gain or "Dgain".

The differential gain in SMC must be sufficiently high to yield the desired amount of damping and stability. A lower differential gain can result in the over shooting the desired set point or even instability. A very high differential gain results in an over-damped slow tracking response. However the derivative term is a major source of output noise and tracking error. This effect is further amplified by a high differential gain. This tradeoff makes the implementation of sliding mode control sub-optimal in some high precision set-point tracking applications. In situations where implementation space is limited and feedback and computation loop delays are critical, there is a need for a more precise and robust control system.

The accurate and predictable control of MEMS devices has been elusive. The present invention seeks to provide a MEMS device which had accurate and predictable control. Further, the control provided by the present invention is less temperature sensitive that other control modes previously considered. Additionally, it is desirable to increase the range of controllable motion so that a MEMS mirror assembly may function in a range of applications.

BRIEF SUMMARY OF THE INVENTION

In one aspect of the present invention, a sliding mode control is implemented as the control system for a MEMS micro device, which in some implementations may be a mirror. The use of the term "mirror" in illustrative and should not be interpreted to limit the scope or applicability of the invention. In another aspect of the invention, the position of a MEMS micro mirror is determined by a capacitor that has an air gap that changes as the position of the mirror changes. The detection capacitor may be formed by a conductive layer on the mirror and a conductive layer disposed on a substrate below the mirror. More specifically, according to one embodiment of the present invention, a MEMS device is provided which can be pivotably mounted to form a gimbaled structure, a first conductive layer is on the mirror and a second conductive layer is on a substrate beneath the mirror, a first capacitor is formed by the first and second conductive layers and determines the position of the mirror. The MEMS device may further include a conductive layer on the frame and a second conductive layer on the substrate beneath the frame, the conductive layer on the frame and the second conductive layer forms a capacitor for determining the position of the frame.

In other embodiments, the present invention can be applied to Multiport Wavelength Selective Switch (MWSS) technology. More specifically, in MWSS technology a MEMS device may have a one dimensional pivot about an axis which operates to control the direction of an optical beam into one of several orientations. Additionally, if an optical beam is divided into its spectral components, a column of one dimensional MEMS devices, e.g. mirrors, may operate to direct certain wavelengths of light into various desired directions. Moreover, the present invention may be applied to a Dynamic Spectral Equalizer (DSE) which may be used to provide an additional function of equalizing the amplitudes of two different light waves. A DSE may also be used to block an undesired wavelength of light so that a replacement signal may be applied to the optical component.

In another embodiment, a MEMS device that has a micro mirror and frame which are pivotable about x and y axes in a gimbaled structure, a substrate is disposed beneath the mirror and frame, the device includes a first mirror electrode on the mirror and second mirror electrode on the substrate beneath the first mirror electrode, the first and second mirror electrodes operable in two modes, a detection mode and a drive mode, the first and second mirror electrodes forming a mirror capacitor when in detection mode and moving the mirror by electrostatic charge when in drive mode, a first frame electrode on the frame and a second frame electrode on the substrate beneath the frame, the first and second frame electrodes operable in two modes, a detection mode and a drive mode, the first and second mirror electrodes forming a mirror capacitor when in detection mode and moving the frame by electrostatic charge when in drive mode.

In other aspects to this, and other, embodiments, the detection mode of the MEMS device may be independent of the detection mode of the frame so that interference between the electrodes is minimized. Additionally, an ASIC may be connected to the electrodes to control the detection and drive modes for the mirror and frame.

Another aspect of the present invention discloses a method for detecting the position of a pivotable mirror above a substrate in a MEMS device, the method may include the steps of providing a capacitor between the mirror and the substrate, detecting the capacitance of the capacitor, analyzing the capacitance, and, correlating the capacitance to a mirror position. The method may further include the step of controlling the position of the mirror using a sliding mode controller. The method may implement the step of controlling the position implements the following relationship:

$$e(t)=s(t)-u(t)-\lambda(du(t)/dt)$$

where e(t) is the error signal, s(t) is the desired deflection angle, u(t) is the angle readout, and $\lambda$ is the time constant for damping around the set point.

The method of the present invention may include the controlling step if e(t) is >0, the controlling step further includes the step of applying a voltage to the first capacitor to effect a positive rotation. If e(t) is <0, the controlling step further includes the step of applying a voltage to the second capacitor to effect a negative rotation. The steps of the method may be performed by an ASIC connected to the substrate and the step of detecting the change in capacitances is performed by the ASIC. The step of controlling the angle of deflection may also be performed by the ASIC. Further, the step of defining a deflection angle is received by the ASIC through a serial digital bus.

In one aspect of the present invention, a modified sliding mode control algorithm that involves "intelligent" of the differential gain within a band around a desired set point. This modification yields lower output noise and reduced steady state output error along with improved setpoint tracking performance. Additionally, the modified sliding mode control requires minimal implementation space or computational power.

DETAILED DESCRIPTION

The present invention provides capacitors for position detection of a MEMS micro mirror and uses a control system, such as sliding mode control, which provides a fast non linear feedback loop to control the position of the mirror. Throughout the specification the MEMS device is referred to as a micro mirror. While this is one suitable application of the technology, one skilled in the art will recognize that the invention can be used in other MEMS devices.

The specification is divided into three parts. First, the term "snap down point" is introduced as a description of a design parameter that is important in MEMS devices. In the context of the MEMS mirrors, the snap down point limits the deflection of the mirror. Second, the use of closed loop feedback control in MEMS mirrors is discussed. Third, the use of capacitors for position detection is discussed in the context of micro mirrors. Finally, the non linear control feedback loop is introduced by the use of sliding mode control as the control mode of a MEMS micro mirror system. The sliding mode control may be modified in a manner which changes the differential gain depending on the error value detected. This modified sliding mode control provides a more precise system that is less sensitive to noise.

Figure 1:
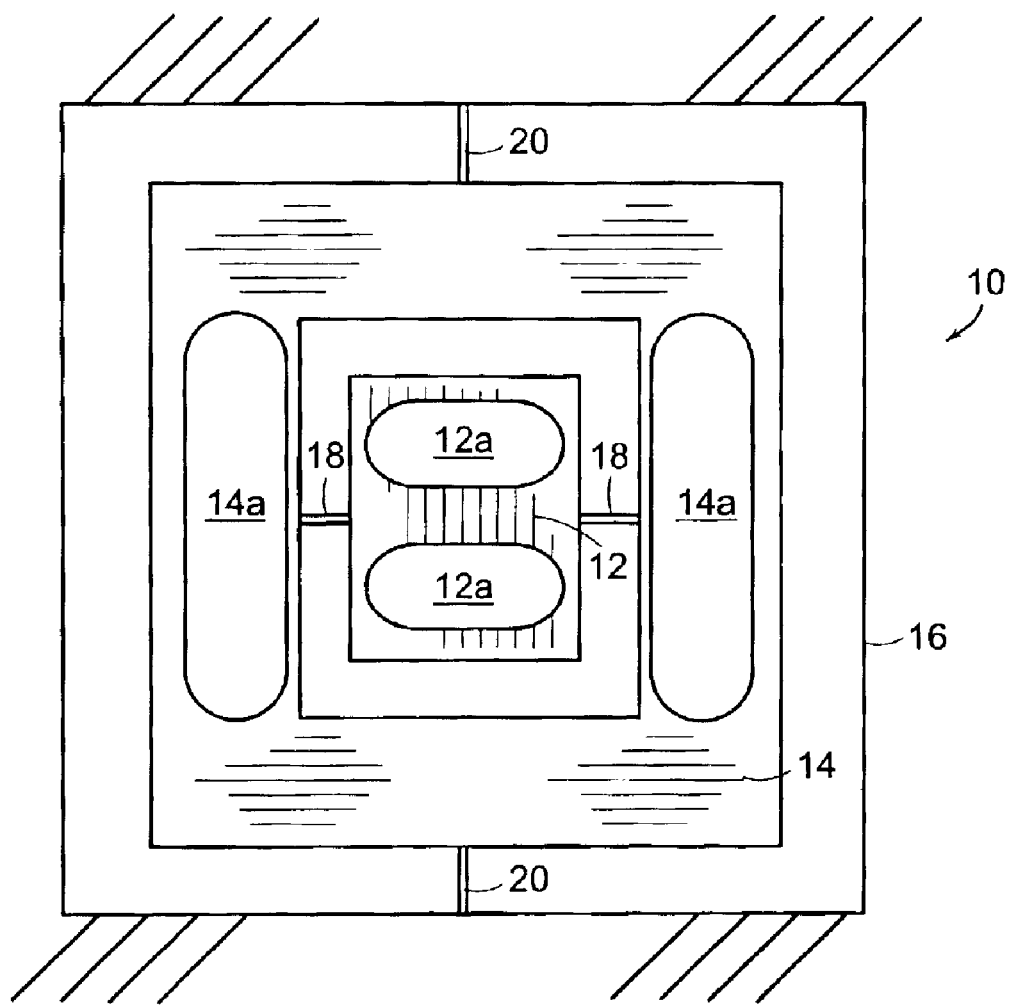
FIG. 1 is a schematic representation of a gimbaled mirror in accordance with the prior art.
Figure 2:
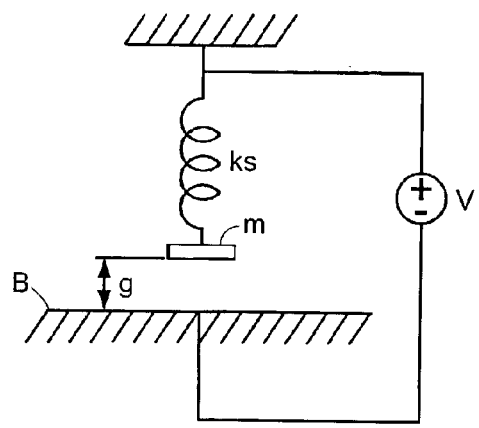
FIG. 2 is a schematic drawing illustrating the snap down condition.

The "snap down point" is a term that is used to describe the point at which the restorative power of a force is insufficient to bring the system into a balanced state. For example, as shown in FIG. 2, a mass m is suspended by a spring with a spring constant ks. The spring urges the mass upward with what is termed a restorative force. The mass is a distance away (represented by the letter "g") from a base B. When a voltage is applied to the base and the mass, the mass is attracted to the base. The attraction exerts a force which is proportional to the inverse square of the distance g, that is: $Fs \propto 1/g2$. As the mass moves closer to the base, the attraction force between the mass and the base becomes much stronger each unit of distance that the mass moves. The distance at which the spring is unable to restore the mass into the resting position is termed the "snap down point" of the system. It is at this point that the mass "snaps down" against the base and remains there unless there is an interruption of voltage that separates the mass from the base.

Figure 3:
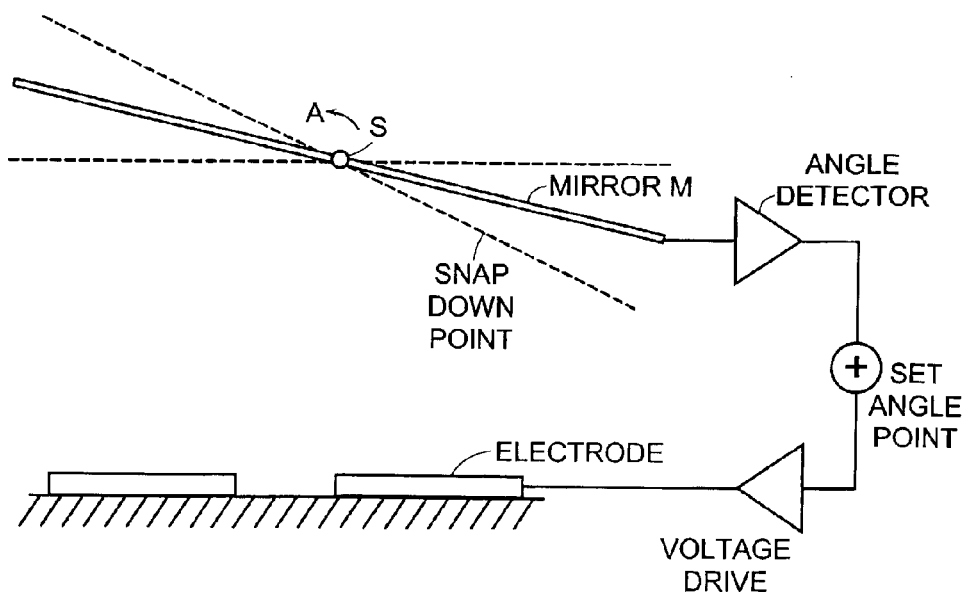
FIG. 3 is an illustration of a prior art MEMS mirror with a control algorithm.

FIG. 3 illustrates the concept of the snap down point in a MEMS device. A mirror m (which is analogous to the mass m) is supported by a torsional spring s. The spring provides the restorative force as shown by arrow A. A conductive layer (not shown) is provided on the mirror and an electrode is provides on a substrate (which is analogous to the base). When the conductive layer on the mirror is charged, the mirror rotates and moves into a desired orientation. This is shown in FIG. 3 as a clockwise movement. When the mirror rotates to a position where the force provided by the torsional spring is insufficient to restore the orientation of the mirror, the mirror will "snap down" to the substrate. Similar to the example in FIG. 2, the mirror will not move until the charge is interrupted.

The snap down point is determined by a number of geometric design characteristics and material selection. More specifically, the size of the mirror, the surface area of the electrodes, especially in relation to the size of the mirror, the torsional force which is supplied by the pivot spring as the restoring force all contribute to the snap down point of the system. Also related to the snap down point is the amount of voltage required to move the mirror to a desired set point. That is, the voltage required to move the mirror will increase with the amount of torsional force in the spring. As the snap down point is in largely determined by the geometry of the MEMS device, in an open loop control, the snap down point will be defined and is a necessary design consideration. In a closed loop feedback control system, especially where the drive voltage is varied, the snap down point is still a useful design consideration.

The desired orientation of the mirror is sometimes referred to as the pointing angle, which generally refers to the angle at which the column of light is directed. In flat mirrors, the pointing angle is usually defined by the angle off a line perpendicular to the substrate. The deflection angle usually refers to the angle above or below a plane parallel to the substrate and including the pivot point of the mirror or frame. The set angle, sometimes referred to as the set point, is the desired angle for the mirror at a given time. The actual angle is, as the name suggests, the actual angle of the mirror at a given time.

Since the range of orientation of the mirror determines the flexibility of the system, the snap down point that corresponds to a small angle of deflection can limit the possible applications of an oriented mirror assembly. Accordingly, it is desirable to maximize the range of movement of the mirror and be able to move the mirror beyond the traditional snap down point in a controlled manner.

Figure 4:
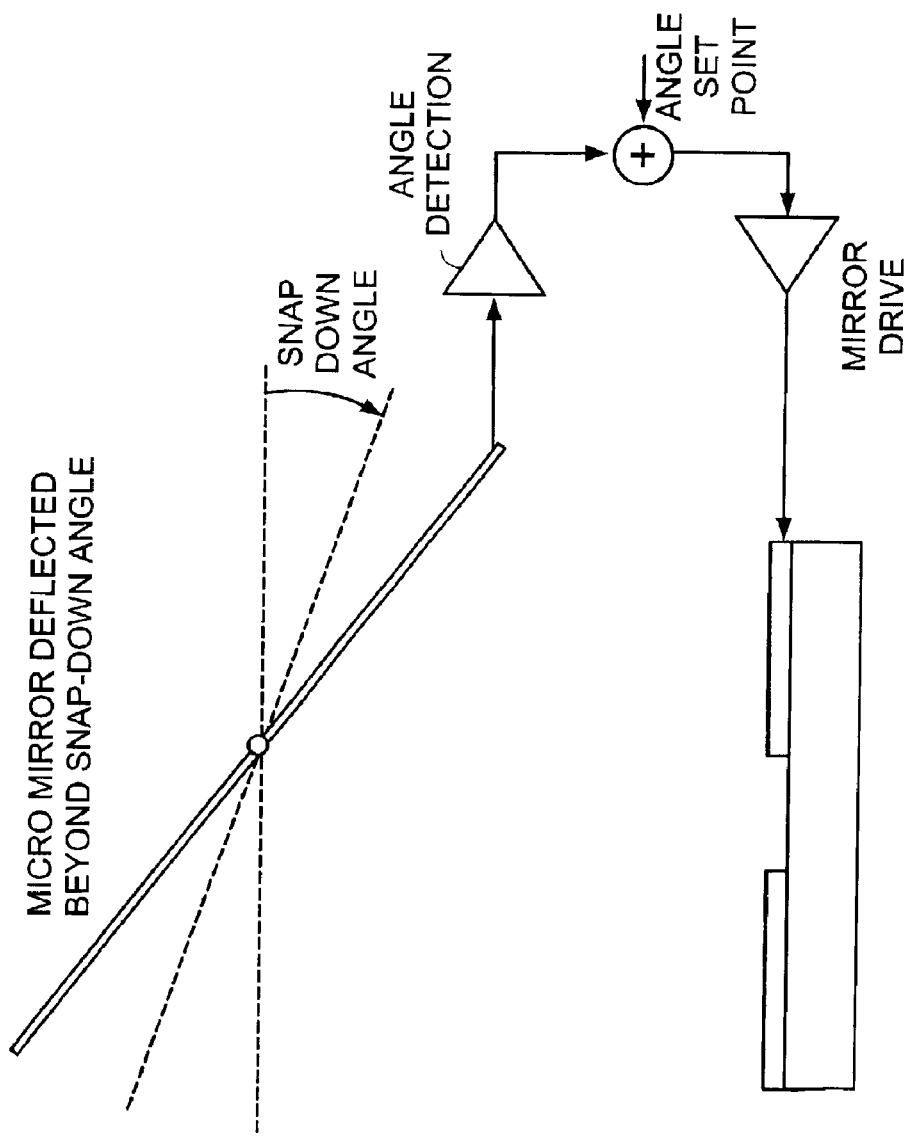
FIG. 4 is an illustration of MEMS mirror embodying one aspect of the present invention which can move the mirror beyond the snap down point.

FIG. 4 illustrates a closed fast feedback loop which can detect the position of the mirror and reduce voltage when the mirror nears the snap down point so that the mirror maintains the set point. As shown, the mirror is deflected beyond the snap down point. One aspect of the invention that contributes to this capability is the particular manner that the deflection angle is detected. Another aspect of the invention is the quick response of the drive. The drive is able to reduce the voltage applied to the mirror when the deflection angle approaches the snap down point. As a result, force applied to the mirror is reduced and the torsional spring is able to restore the mirror to a resting position from a larger deflection angle. The variable voltage based on position of the mirror expands the usable range of deflection for the mirror.

Figure 5:
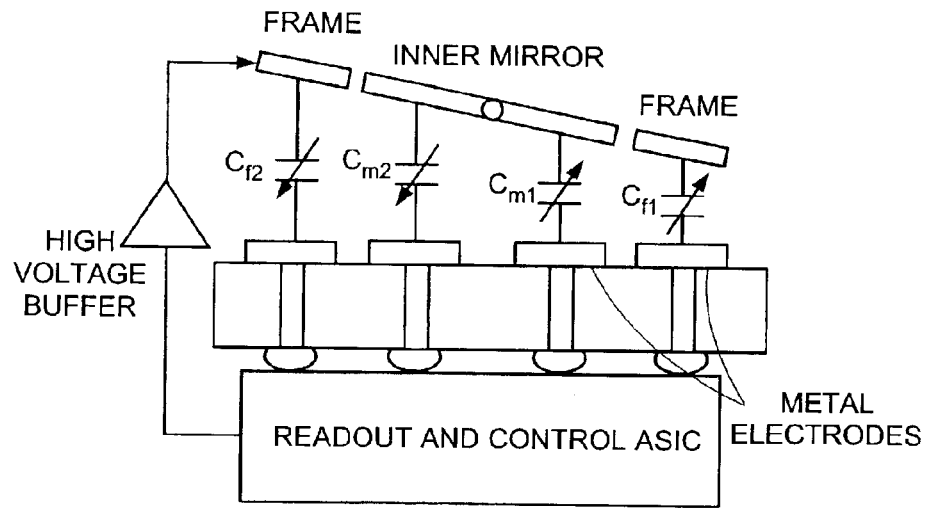
FIG. 5 is an illustration of a MEMS mirror which is adapted to use capacitances to determine the position of the mirror.

In another aspect of the invention, the position of the mirror is determined by measuring the effective air gap between the mirror and a substrate. More specifically, the change in the capacitances between the mirror and substrate mirror are used to determine deflection. As shown in FIG. 5, the inner mirror and frame gimbaled structure is mounted over a substrate. Metal electrodes on the surface of the substrate proximate adjacent the gimbaled structure cooperate with portions of the gimbaled structure to form capacitors. Two capacitors are formed on the frame, Cf1 and Cf2. Similarly, two capacitors are formed on the inner mirror Cm1 and Cm2.

As shown in FIG. 5, the electrode on the substrate and the conductive materials on the mirror have been used to position the mirror using electrostatic forces, these are sometimes referred to as control or drive electrodes. In the preferred embodiment, the mirror is made of silicon. If the mirror is formed from silicon, the mirror itself may be sufficient to form the electrode. Similarly, if the frame is constructed from silicon, the frame itself may be sufficient to for an electrode. In one aspect of the invention, these same electrodes/conductive layers can be used to provide position detection of the mirror. Of course, other electrodes/conductive layers can be used or created instead of or in addition to the "drive" electrodes/conductive layers. As discussed in more detail below, the use of the same electrodes/conductive layers provides for a simpler design that is easier to manufacture and implement.

The capacitors may have a capacitance between 1 and 100 fF (Farad) with a generally desired amount of 50 Farads. One skilled in the art will recognize that the level of capacitance should be higher than the noise level of the control circuit, yet the signal must be within the range acceptable based on the electronics of the control circuit. As a result, the values are illustrative only and should not limit the scope or range of the invention in any manner.

When the mirror is electrostatically driven, the electrodes which are in place to drive the mirror can be used, as indicated above. If the mirror is driven using some other means, such as magnetic or piezoelectric force, then electrodes can be deposited on the mirror and substrate to the extent necessary, so that the advantages of determining the position though capacitance can be realized. Of course, using an electrostatic drive along with position detection using capacitance provides a compact control system.

It should be apparent that the inner mirror forms capacitors with the drive electrodes. If the inner mirror shown in FIG. 5 rotates clockwise Cm1 increases and Cm2 decreases due to the corresponding change in the effective air gap. Similarly as the outer frame rotates, Cf1 and Cf2 change due to the change in their respective air gap. Accordingly, by measuring the difference between the capacitances Cm1 and Cm2, and Cf1 and Cf2, the angle of deflection of the mirror and the frame can be determined.

Although two capacitors are shown for each of the mirror and frame, it is possible that a single capacitor could be used on each of the mirror and frame. In that configuration, the capacitor reading would correlate to some predetermined position. Since two capacitors provide the possibility of reading a differential capacitance, the readings are more accurate and thus provide a better determination of position, and thus is the more desirable configuration.

Figure 6:
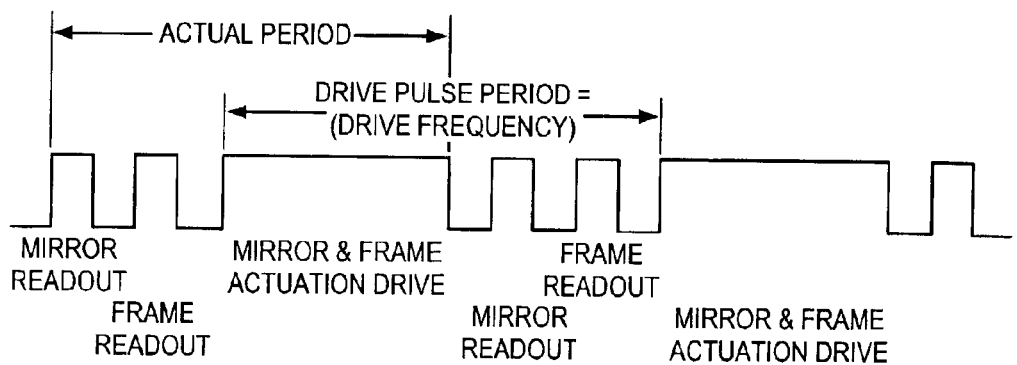
FIG. 6 is a timing diagram for the determination of the position and controlling the movement of the mirror.

The capacitances are determined by an Application Specific Integrated Circuit (ASIC) is attached to the backside of the substrate. The ASIC also implements the servo control algorithm and interfaces with an external user to receive set points through a digital bus. Since the ASIC can be used for both detection and control, the number of connections within the system is reduced and the overall structure of the system is simplified. The position detection and control of ASIC periodically switches the electrodes between its capacitance readout and its drive circuitry, as shown in FIG. 6. By time multiplexing the electrodes between drive and readout, the number of additional electrodes is eliminated. In one embodiment, the mirror position is determined, then the frame position is determined, and finally the signal is adjusted to drive the mirror and frame.

In another aspect of the invention, the cross talk between the mirror and the frame is eliminated by reading each member separately. More specifically, as shown in FIG. 6, for example, when the position of the mirror is being detected, the capacitances Cm1 and Cm2 are determined and the capacitors Cf1 and Cf2 on the frame are grounded. Similarly, when the position of the frame is detected, the mirror capacitors Cm1 and Cm2 are grounded. This scheme allows multiplexing of the capacitive detection circuitry between the axes and reduces the overall die area.

The micro mirror pointing angle servo control scheme is a sliding mode controller. Sliding mode controllers are discontinuous feedback systems where the control switches between two distinctive values with a high frequency of the system state. Sliding mode control is known to provide high performance by being insensitive to system parameter variation, and by having good disturbance rejection capabilities. Servo controllers using sliding-mode control have been used for various applications including disk drives and other devices.

The present invention may be applied to Multiport Wavelength Selective Switch (MWSS) technology. More specifically, in MWSS technology a MEMS device may have a one-dimensional pivot about an axis which operates to control the direction of an optical beam into one of several orientations. Additionally, if an optical beam is divided into its spectral components, a column of one dimensional MEMS devices, e.g. mirrors, may operate to direct certain wavelengths of light into various desired directions. Moreover, the present invention may be applied to a Dynamic Spectral Equalizer (DSE) which may be used to provide an additional function of equalizing the amplitudes of two different light waves. A DSE may also be used to block an undesired wavelength of light so that a replacement signal may be applied to the optical component.

Figure 7A:
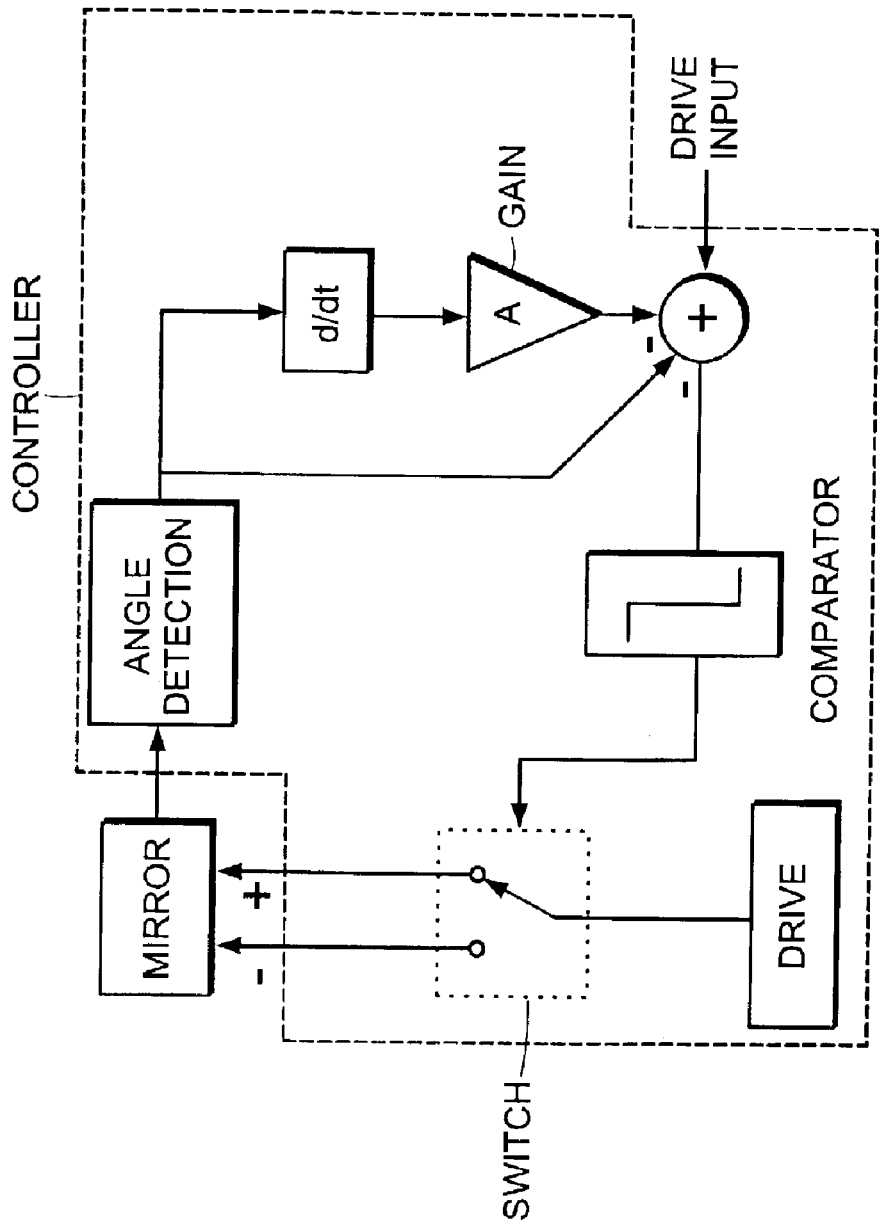
FIG. 7A is a MEMS mirror servo system with sliding mode control.

FIG. 7A shows the block diagram of the micro mirror servo system for a single axis of rotation. A understood by those skilled in the art, multiple loops using the same scheme can be used to control multiple axes of rotation. For example, a gimbaled structure with a mirror which is located within an outer frame would require a double loop architecture.

The controller implements the error term [1-2]

$$e(t)=s(t)-u(t)-\lambda(du(t)/dt)$$

where e(t) is the error signal (or variance), s(t) is the angle set point, u(t) is the angle readout and λ is the time constant for damping the fast switching around the set point. The term λ is sometimes referred to as the "D-gain" of the system. It is a "constant" that is programmed into the control based on the usual operating parameters. Previously, the D-gain had been a fixed value that was determined by two design considerations. First, the system should be responsive to a change in set point quickly, this is sometimes referred to as the speed or the switching rate. A low switching rate contributes to a lag in the system and the control of the device will not be quick and the device will not seem responsive. The switching rate should be fast enough to complete the change of position in a desired time period and maintain the device position very close to the set point. The speed of the device under control is another factor that should be controlled. If it is chosen so that the operation will be fast and responsive, the system may not have the required stability and the mirror will overshoot the set point. Alternatively, the controlled device may oscillate around the set point until the motion dampens out. Accordingly, this constant is determined to be large enough to have a quick responding system yet not so quick that the system will be unstable. The modified sliding mode control varies the value of the constant based on the error detected by the detector.

Figure 7B:
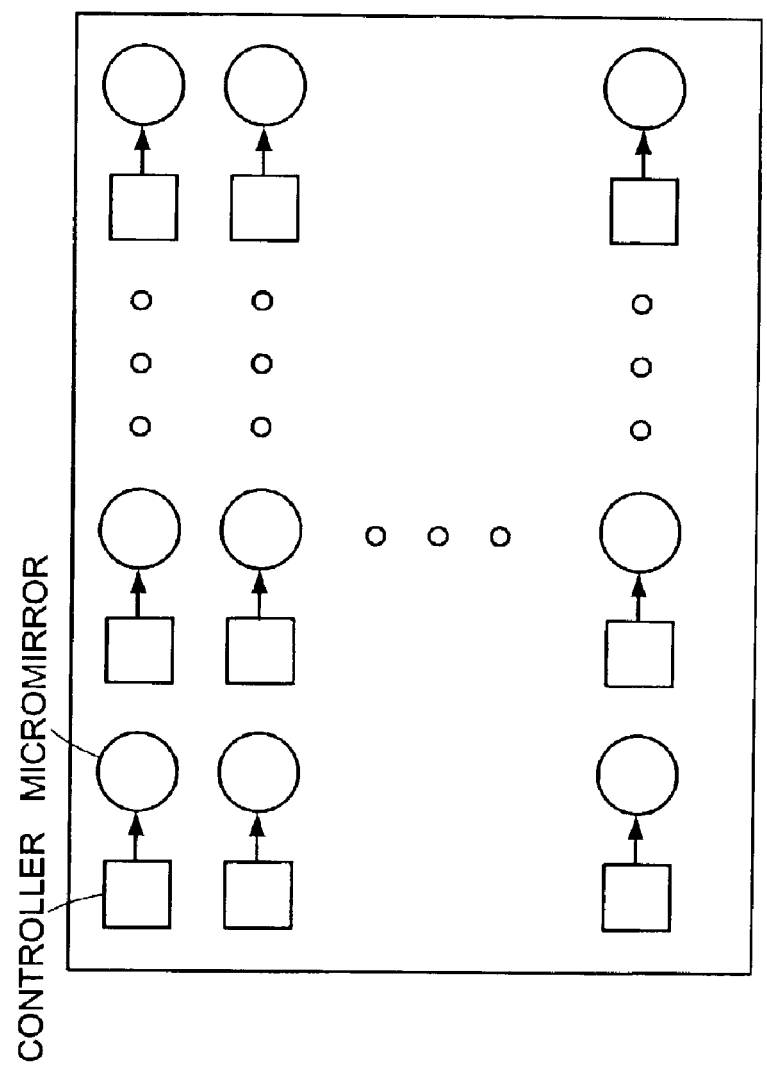
FIG. 7B is a MEMS mirror array shown with a single controller for each mirror; and, FIG. 8 is a switched capacitor differential capacitance readout front end circuit.

One of the advantages of sliding mode control in this embodiment of the present invention is the compactness of the controller, especially when used with an electrostatic drive. As a result of the compactness of the controller, a controller can be used for each mirror as shown in FIG. 7B. As shown, a single controller is connected to each mirror in the array. The advantage of a single controller for each mirror is that the speed of response enhanced greatly and fewer connections are required. Of course if a controller has excess capacity, which may happen due to the simplicity of the design, a few mirrors may be controlled by a single controller. In that situation, a small array, such as 5 mirrors by 5 mirrors may be controlled by a single controller. As readily understood by one skilled in the art, the controller may be an ASIC or other suitable controller for a given application.

In a discrete time sliding mode controller the magnitude of the error term (or variance) goes to zero ($|e(t)| \rightarrow 0$). In this case, the system becomes equivalent to a first order (single pole) system with an exponential response and time constant of $\lambda$. Thus the servo system response can be controlled by $\lambda=0$. The controller applies a voltage pulse to electrode 1 of frame or mirror, which has a positive rotation feedback when $e(t)>0$. If $e(t)<0$, a voltage pulse is applied to the other electrode for a negative rotation. The two feedback states (positive and negative rotation) form the control inputs of the sliding mode controller and are applied with over two orders of magnitude higher frequency than the natural mechanical resonance frequency of the device. The pointing angle will have small amplitude limited cycle oscillations around the set point due tot he switched control. The amplitude of this signal is reduced by the high frequency drive and thus a very high resolution pointing stability is achieved.

Using a fast feedback control system enables each mirror pixel to have its own controller. When each mirror pixel has its own controller, there is a marked increase in the responsiveness of the system and the ability of controlling the mirrors beyond the snap down. The use of capacitors to determine the position of the mirror decreases the size requirements and the complexity of the system.

The use of closed loop control, especially sliding mode control, has the benefit of eliminating any feedback needed from either piezoresistive detectors or from optical sensors external to the system. Since the feedback loop is simplified, there is greater design flexibility with respect to other considerations. For example, having a fast response closed loop feedback system enables MEMS mirror geometrical configurations that have been avoided in the past due to the design constraints of a small deflection angle before snap down. Several benefits to the device geometry result from the use of a fast feedback closed loop control system. First, there is more latitude in mirror geometry. For example, a larger surface area can be used for an electrode and, as a result, the required voltage for controlling the deflection angle can be reduced. Additionally, the torsional spring can be designed with a smaller spring constant which will require still less voltage to achieve a desired deflection angle. Prior to the present invention, design parameters were limited because of the ability of the controller to adequately monitor and control the mirror These modifications were not feasible without the fast feedback loop of the present invention.

In order to attain large deflections the maximum available drive signal amplitude should be adequate to deflect the device beyond the typical snap down point. The drive voltage can be reduced by changing the electrode and device geometries as mentioned before, and by reducing the support springs constants. Furthermore, the required voltage amplitude can be reduced by applying fixed bias on the mirror and frame. Because of the lower force requirements, these modifications result in an effective magnification of the drive voltage and an ability to obtain larger electrostatic forces.

There are various schemes that can be used to read the differential capacitance of the inner mirror ($\Delta Cm=Cm1-Cm2$) and the frame ($\Delta Cf=Cf1-Cf2$). In a preferred embodiment, a low noise fully differential switched capacitance circuit is used. The advantage of switched capacitances is that they can be designed to have very small sensitivity to parasitic capacitances, they can resolve very small capacitance changes and can be fully integrated on a ASIC. The two inner mirror (or outer frame) electrodes are connected to the inputs of the circuit. In the readout cycle the common node of the device is driven by a constant amplitude voltage pulse. This voltage pulse charges the device capacitor pairs (C1 and C2) and two packets of charge proportional to C1 and C2 are integrated on Cf1 and Cf2 respectively. The output out+ is equal to the integrated charge on Cf1 divided by Cf1, and hence proportional to C1. Similarly out− is proportional to C2. The scale factor is Vcharge/Cf where Vcharge is the amplitude of the charging pulse and Cf=Cf1=Cf2.

Another aspect of the invention includes using multivaried discrete voltage levels for feedback instead of binary levels to reduce the amplitude of limit cycle oscillations. Also, binary feedback with a variable pulse width (or pulse duration) can be used to obtain similar improvement. When used with a constant voltage and a varied pulse duration the electrodes will behave in a similar fashion as if the voltage was being varied. Because the pulse duration is varied, the time any one electrode experiences a voltage is varied and the implementation of a design according to the invention may be facilitated.

Figure 8:
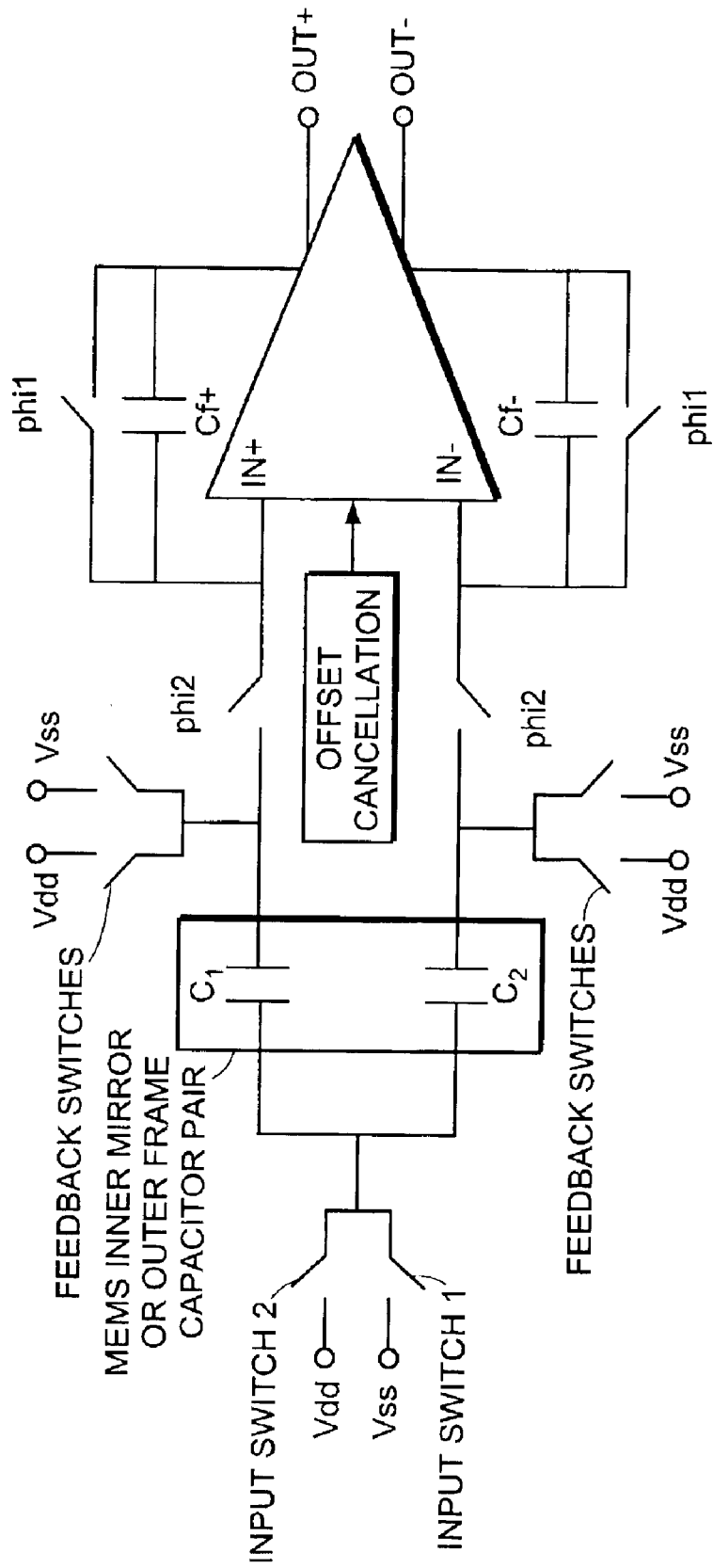

The readout circuit of an implementation of an aspect of the present invention, as shown in FIG. 8, is a fully-differential switched-capacitor circuit that detects the difference between the two input capacitances (C1 and C+1), so that (Vout+−Vout−) is proportional to (C1−C+1). The capacitance change is converted to the electrical voltage signal by charging the capacitors with fixed voltages of Vdd and Vss, transferring the charge to the readout, and integrating the charge on fixed on-chip capacitors (Cf+ and Cf−) in the circuit. In the readout phase of operation, all the feedback switches are open and the phi2 switches are closed. Switches phi1 are used to reset the charge on the charge integrating capacitors (Cf+, Cf−) prior to the readout cycle and during the readout cycle they take an open state. The readout is performed by closing and opening input switches 1 and 2 consecutively. This operation will cause C1 and C+1 capacitors charge to the voltage difference of Vdd−Vss. A packet of charge equal to (Vdd−Vss)×C1 will be transferred to Cf+ and accumulated to generate a voltage equal to the −(Vdd−Vss)×C1/Cf+ at out+ node. Similarly the charge on C+1 is integrated on Cf− and the voltage at out− becomes −(Vdd−Vss)×C1/Cf−. Cf+ and Cf− are set to be the same and equal to Cf. Thus Vout+−Vout−=−(Vdd−Vss)×(C1−C+1)/Cf which is proportional to the input capacitance change. In order to improve the readout accuracy the amplifier input offset is cancelled actively by the offset cancellation block.

The readout front-end also supports feedback to the MEMS capacitors in a "feedback phase" when the switches phi2 are open, the detection circuit is disconnected from the input capacitors, and the feedback switches are connected to Vdd or Vss depending on the feedback polarity (or rotational direction for the MEMS mirrors). Note that the feedback switches on the upper and lower half of the circuit always are in opposite state with respect to each other such that if one is connected to Vdd the other one is connected to Vss. In this manner the force on the two opposite mirror electrodes are ensured to be unbalanced and hence an effective torque required for the torsional motion of the device is generated.

In another aspect of the invention, multi valued discrete voltage levels (e.g. 0, 0.5, 1) for feedback instead of binary (i.e. 0, 1) may be used to reduce the amplitude of limit cycle variations. Also a binary (or multi-valued) feedback with variable pulse width and/or duration may be used to obtain an improved control system of the present invention.

Another aspect of the invention is achieved by implementing the sliding-mode control algorithm or any other control scheme external to the ASIC. In such case the ASIC includes the digital interface and a number of digital-to-analog converters (DACs) to receive and convert the external digital commands to local analog drive signals for the micro mirrors. The digital interface is preferred to be serial to reduce the number of interconnects, however it can be also parallel. The DACs can be also internally multiplexed on the ASIC so that each DAC drives multiple electrodes and/or micro mirrors. In the latter case additional sample-and-hold circuitry might be needed on the ASIC to meet high accuracy drive signal requirements. Also depending on the overall control scheme the ASIC may include the position detection circuitry or it may not.

Figure 9:
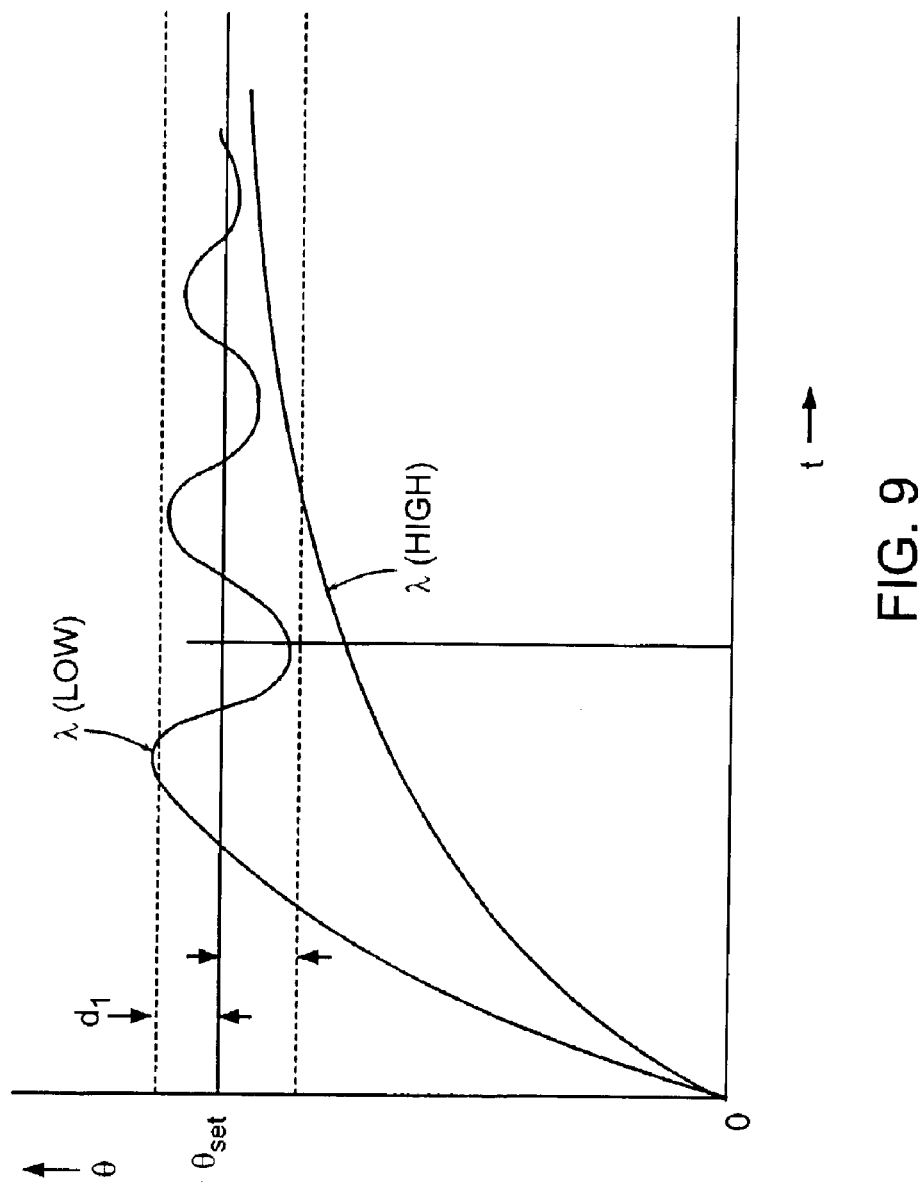
FIG. 9 is a graph illustrating a set angle (Theta) versus time.

As mentioned previously in connection with FIG. 7A, the differential gain, or λ, can be set. As illustrated in FIG. 9, if the differential gain is set high (is given a high numerical value) the position of the object, e.g., mirror, moves to a steady state in an elongate curve which may be asymptotic to the set value, e.g., angle, (Theta set), or some other value. When a high value of λ is used, two errors can be introduced into the design system. The first is a "steady-state" error or offset error in which the position of the (mirror) settles on some value that is different than the set value. The second is noise that is generated as a result of the high value of λ.

It is often desirable to reduce the value of λ selected in the algorithm. If a small λ is used, the value of the parameter, e.g., the angle of the mirror, will rapidly move toward the set point. However, it is likely that the value will "overshoot" the set point and oscillate around the desire set point. This oscillation can introduce instabilities into the system, and significantly increase the time that is required to reach the set point in a steady state. This is illustrated in FIG. 9. Also, for very small λ the system could become unstable.

There are at least two methods for minimizing noise and steady state output errors for sliding mode control. The first, boundary layer control involves switching to a continuous control in a boundry later. A boundary layer is defined by a gap around zero value of the sliding mode function. In this method, sliding mode control is applied when the value of the sliding-mode function is outside the boundary layer gap about the set point. Within the boundary layer, the control is switched to an analog continuous controller. This reduces noise and yields smoother performance. Because boundary layer control is continuous (and analog) within the boundary layer, it requires more computational power than the conventional sliding mode control. Additionally, in applications where the control is entirely digital, continuous control within the boundary layer is not an option.

Another method for improving the noise and steady state output errors for sliding mode control includes the use of a second order differential sliding mode equation. This modification involves a sliding mode function that is the sum of the error signal, the amplified derivative of the error signal and the amplified integral of the error signal. Including the integrator in the sliding mode function yields better noise control and reduces error at steady state. Integral control requires more implementation space and rigorous controller parameter tuning for acceptable performance. Although the final steady state output error is minimized, the integration introduces additional phase lag slowing that set point tracking performance. Moreover, there are implementation issues and complexities involved with the second order sliding mode control which would require additional logic circuits and computational requirements.

In an embodiment of the present invention, the sliding mode control is modified and achieves the desired performance without considerable additional implementation space or computational power. The modified sliding mode control reduces the differential gain when the performance output signal reaches within a band around the desired set point. In this embodiment, the control achieves desired damping and stability during transients (outside the band) and sufficient noise and tracking error reduction at steady state. The modification essentially eliminates the tradeoff between tracking stability and output noise attenuation and yields lower output noises and reduces steady state output error, along with improved set point tracking performance. Other advantages of this modification include the minimal implementation space and that it does not modify the inherent digital nature of the control and is less complex.

As discussed in connection with FIG. 7A, sliding mode controllers are discontinuous feedback systems, which are known to provide high tracking performance and good disturbance rejection capability in addition to being insensitive to system parameter variations. Servo controllers based on sliding mode methods have been used for various set point tracking application with success. Sliding mode control uses a digital control technique that applies two distinct values of control input, e.g., v+, v− depending upon the value or sign of a certain sliding mode function, e(t). A control input v(t) is switched about the switching curve F(e, t)=0, and satisfies the following equation $V(t)=v+$ if $e(t)$ greater than or equal to 0

$V(t)=v-$ if $e(t)$ less than 0

For example, in a first order sliding mode control, the sliding mode function F(e,t) is defined by the equation $e(t)=\lambda(-du/dt)+s(t)-u(t)$ Where λ is the differential gain (D-gain) for the derivative term −du/dt, Theta is the angle and Theta set is the desired set angle. This is a slightly modified form of equation 1-2 above. The goal is to keep the trajectory on the sliding mode curve e(t)=0 by switching control values at theoretically infinite frequency about the curve. FIG. 7A illustrates a first order sliding mode control which is popularly used due to its simplicity and ease of implementation.

When the first order sliding mode control is implemented, there are several sources of errors which can lead to offsets, output noise and undesirable behavior. For example, when there is discrete time sampled control systems, the SMC can only switch as fast as the sampling frequency of the system. This causes the trajectory to chatter about the switching curve. This chatter is increased by the presence of any system or measurement noise. Additionally, the derivative term −du/dt in the above equation "amplifies" the measurement noise in the system which leads to increased output noise. In a discrete sampled system the derivative is generated using finite difference between the error at its current sample time and the error at the previous sample time. This approximation creates another source of error.

The proportional term a(t)−u(t) in the above expression for e(t) always attempts to move the trajectory toward the desired set point. The purpose of the differentiator is to provide enough damping or braking to avoid overshooting the set point. In this way, the differentiator term λ does not necessarily move the trajectory to the switching curve. Imperfections in the differentiator and the presence of noise can lead to misleading control inputs, which in turn get amplified by the differentiator gain λ. Moreover, as s(t)−u(t) becomes small, the proportional term is dominated by the differential term λ (−du(t)/dt). This leads to a steady state output error (offset) that grows with the value of λ.

Figure 10:
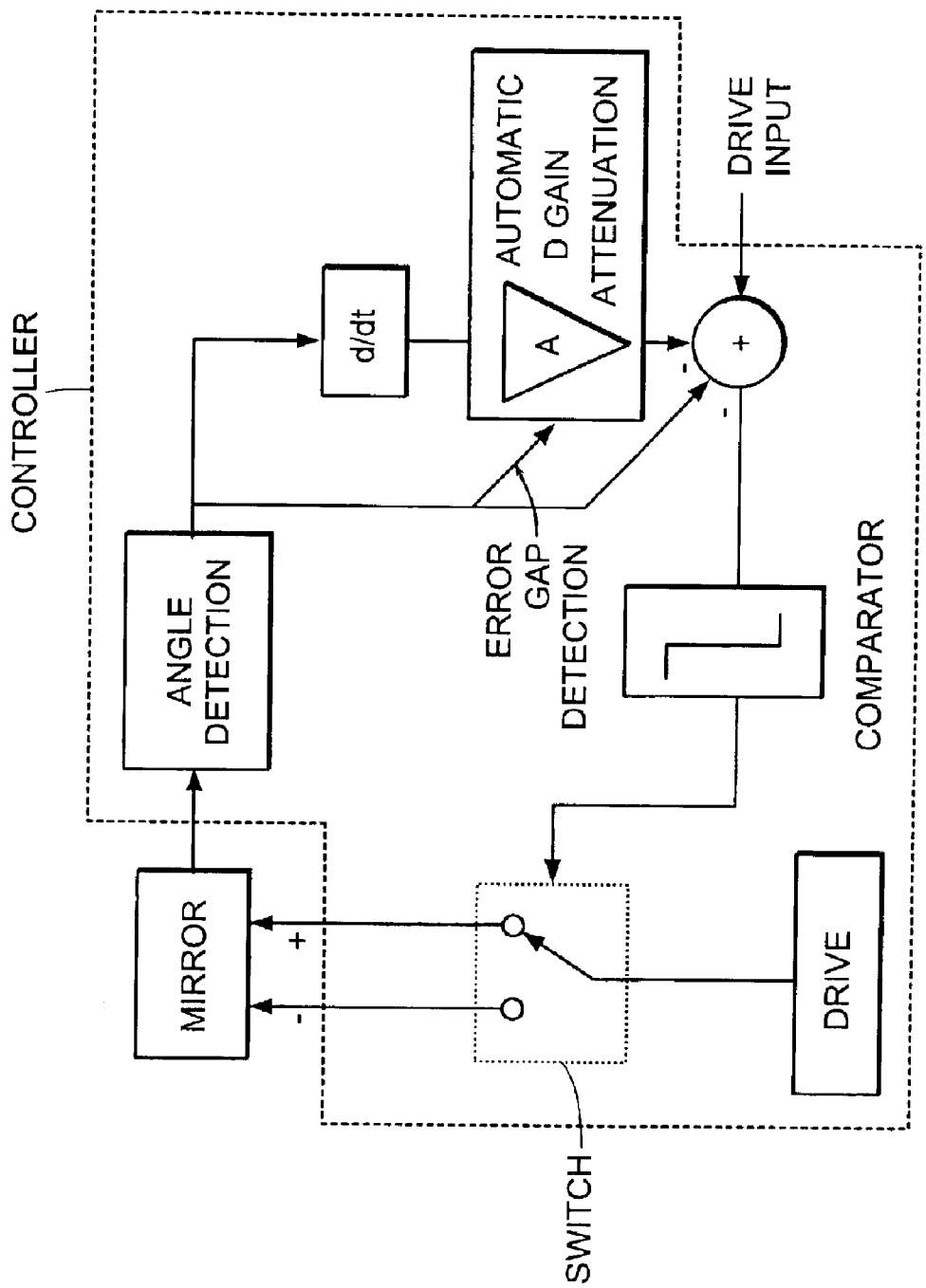
FIG. 10 illustrates the implementation of a modified sliding mode controller according to one aspect of the invention.

As noted above, most of the output errors associated with the first order differential sliding mode control are related to the differential term. Accordingly, as illustrated in FIG. 10, in order to reduce the effect of output errors this embodiment of the present invention modifies the differential gain during the control operation. The differential gain is modified so that sufficient damping and stability during transients and reduced output noise and output error when the transients "dies out." This modification retains the damping and stabilizing effect of the derivative by having a sufficiently large Dgain for system stability in the presence of large errors and reduces the noise and offset deterioration by reducing the Dgain when the system settles close to the set point.

As described above, the Dgain is modified depending on the error value detected. In general, when the error s(t)−u(t) is large, a higher value for the gain is used and when the error is small, a lower value for the gain is used. The error values which set the value of the gain is the boundary of the set point. The boundary can be different above and below the set point. For example, the upper boundary can be 100 mdegrees and the lower boundary can be 150 mdegrees. Often the object may settle at a position below the set point and increasing the boundry distance ensures that Dgain is switched; the Dgain switching reduces the steady state error (offset) and provides settling to the setpoint with higher accuracy.

Figure 11:
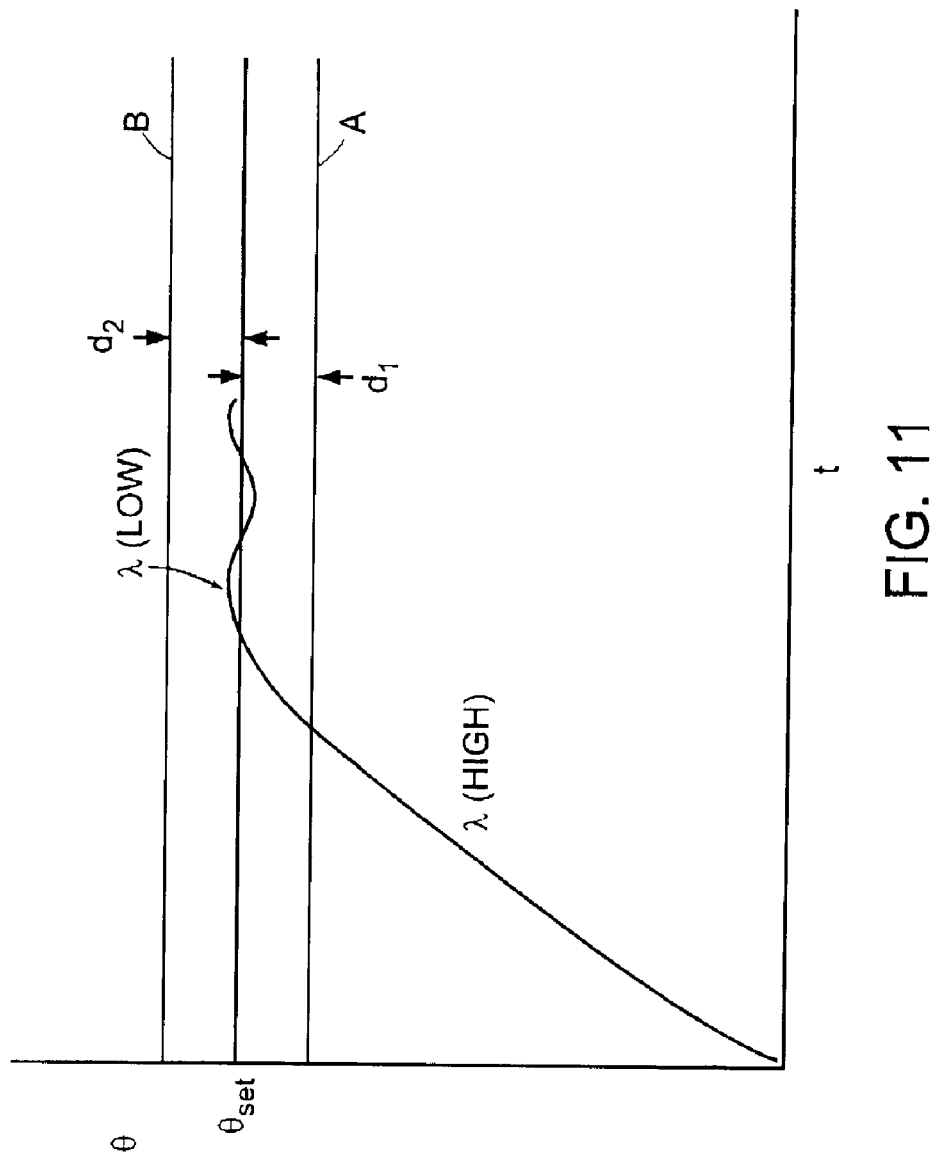
FIG. 11 is a graph illustrating the movement of an object to a set point using a modified sliding mode control according to an aspect of the invention; and, FIGS. 12 and 13 are graphs illustrating the an implementation of the modified sliding mode control.

FIG. 11 illustrates the modified sliding mode control according to this aspect of the present invention.

Figure 12:
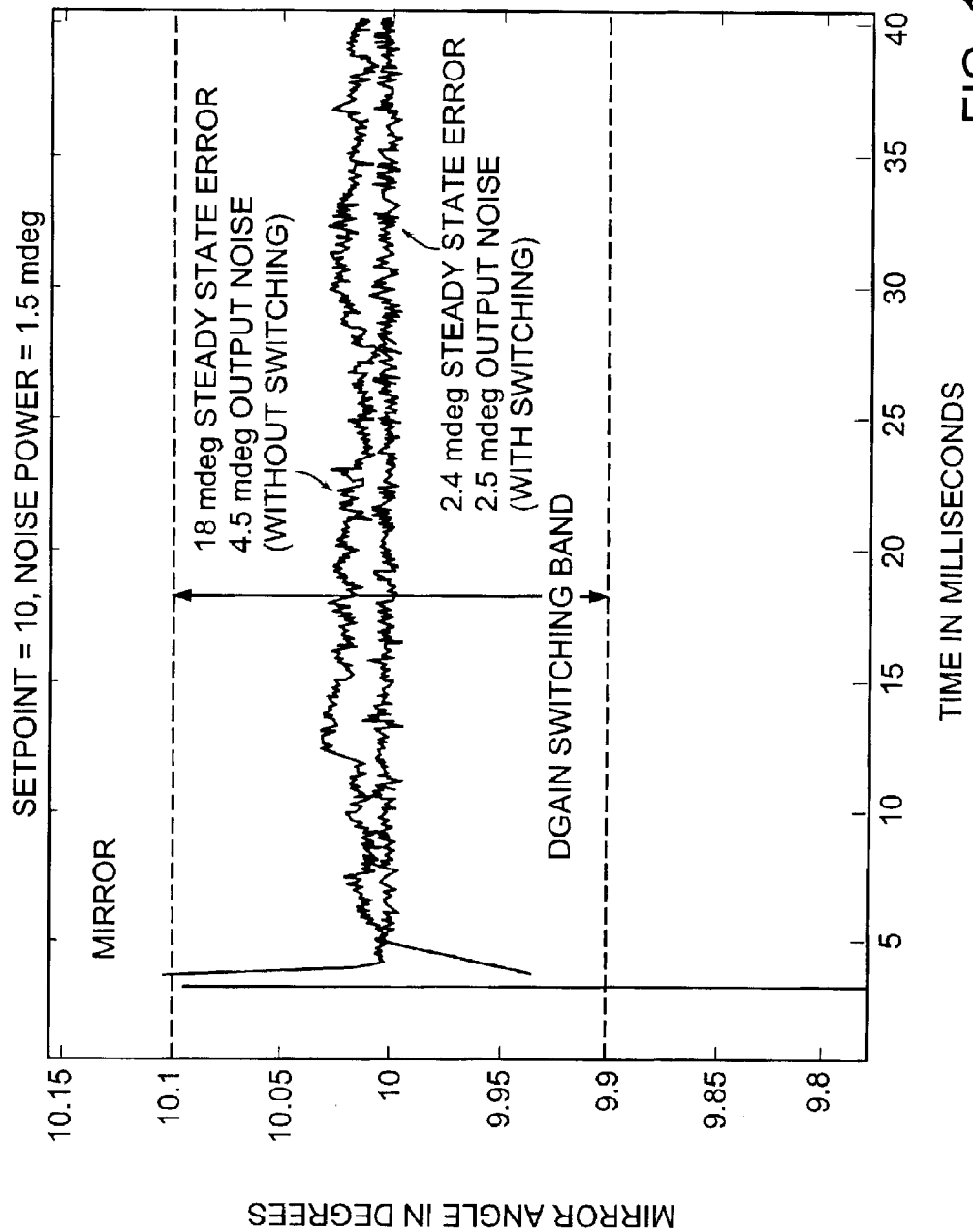

FIG. 12 illustrates a graphical representation of the implementation of this aspect of the present invention. Lines A and B are a distance $d_1$ and $d_2$, respectively, away from θ set. Between lines A and B the higher value of λ is used. Once the error value is less than d1, the lower value of λ is used. This allows for a quick travel to the set point.

This scheme can be implemented in an integrated circuit because it only requires switches and comparators, components that do not require much space. The scheme is described in a preferred form as having two parameters, the error band gap d>0 defines the error band, −d<e(t)<d within which the D-gain λ is attenuated and the factor γ by which it is attenuated. The gap d has to be chosen sufficiently small to avoid overshoots. The factor γ is chose large enough to provide minimal damping for stable operation within the gap. One may chose an asymmetric band defined by −d1<e(t)<d2, with d1 not equal to d2, to achieve optimal performance for a non-linear system. The "Automatic D-gain attenuation" block in FIG. 11 essentially satisfies the following logic:

$$V(t)=V+ \text{ if } e(t)>=0$$

$$V(t)=V- \text{ if } e(t)<0$$

Where $$e(t)=\alpha\lambda(-du(t)/dt)+s(t)-u(t)$$

And α=1 if e(t)>d2 or e(t)<−d1 (outside the band)

α=γ, if −d1,e(t)<d2 (inside the band).

Figure 13:
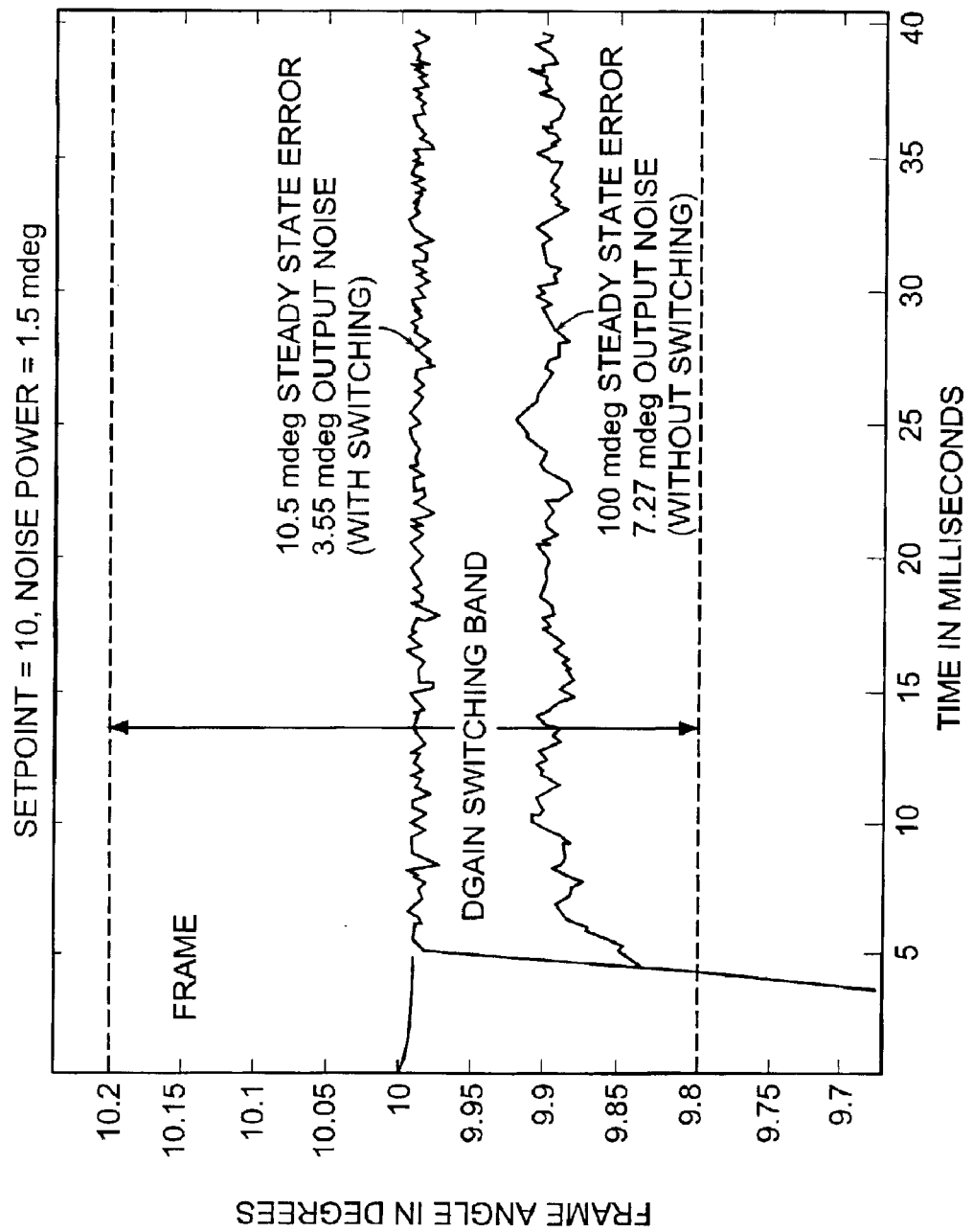

The proposed scheme has been implemented in a 2-axis micro mirror control design in numerical simulations and experiments. In the experiments, the micromirror is an electrostatically actuated two axis gimbaled mechanism capable of rotating about two perpendicular axes. Numerical simulations show that the modified sliding mode control scheme achieves considerable improvement over more conventional sliding mode control. In FIGS. 12 and 13, the inner and outer axes are required to rotate from 0 deflection to 10 degrees. The dotted line represents conventional sliding mode control and the solid line corresponds to the modified sliding mode control. The switching band gap is chosen to be d=100 mdeg for the inner axis and d=200 mdeg for the outer axis. The attenuation factor is chosen to be γ=0.1

|  | Output noise (Sliding-mode) | Output noise (Modified sliding-mode) | Steady state output error (offset) (Sliding-mode) | Steady state output error (offset) (Modified sliding-mode) |
| --- | --- | --- | --- | --- |
| Mirror | 4.5 mdeg | 2.5 mdeg | 18 mdeg | 2.5 mdeg |
| Frame | 7.27 mdeg | 3.55 mdeg | 100 mdeg | 10.5 mdeg |

As the information in Table 1 shows, there is a 50% reduction in noise and about 70–90% reduction in steady state output error by using the modified sliding mode control scheme. Experimental implementation of the modified sliding mode control as presented here confirms the values the determined from the simulation.

Having described preferred embodiments of the invention, it should be apparent that various modifications may be made without departing from the spirit and scope of the invention, which is defined in the claims below.

What we claim is:

1. A method for controlling the position of a pivotable mirror above a substrate in a MEMS device comprising the step of controlling the position of the mirror using a sliding mode controller by implementing the following relationship:

$$e(t)=s(t)-u(t)-\lambda(du(t)/dt)$$

where e(t) is the error signal, s(t) is the desired deflection angle, u(t) is the angle readout, and λ is a selected value that varies depending on the position of the mirror.

2. The method of claim 1 wherein λ is selected to be one value when a distance between a desired position and an actual position is large and is selected to be a different value when the distance between the desired position and the actual position is small.

3. The method of claim 2 wherein λ is selected to be a higher value when the distance between the desired position and the actual position is large and is selected to be a lower value when the distance between the desired position and the actual position is small.

4. A method for controlling a MEMS having a pivotable micro mirror above a substrate, a first and second capacitors disposed between the mirror and the substrate so that as the mirror pivots, an effective air gap of the capacitors changes, the method comprising the steps of:

defining a deflection angle for the mirror as a set point, comparing an actual position of the mirror with a desired position by measuring the difference in capacitances in the capacitors, controlling the position of the mirror using sliding mode control to adjust the mirror so that it achieves a desired reflection angle according to the following relationship:

$$e(t)=s(t)-u(t)-\lambda(du(t)/dt)$$

where e(t) is the error signal, s(t) is the desired deflection angle, u(t) is the angle readout, and λ is a selected value that varies depending on the position of the mirror.

5. The method of claim 4 wherein the steps of determining the position and controlling the position is performed by electrodes.

6. The method of claim 5 wherein the step of determining the position and controlling the motion is determined by a sliding mode controller wherein the controller implements the following relationship where differential gain is multiplied by a factor α:

α=1 if $s(t)-u(t)>d2$ or $e(t)<-d1$ (outside the band)

α=γ, if $-d1$, $s(t)-u(t)<d2$ (inside the band);

where e(t) is the error signal, s(t) is the desired deflection angle, u(t) is the angle readout, and λ is the time constant for damping around the set point.

7. A MEMS micro mirror comprising:

a mirror, a substrate below the mirror, a gimbal structure for movably supporting said mirror about said first and a second axes;

a position detector that determines the position the mirror, a controller implementing a first order differential sliding mode control to move the mirror to a desired position, wherein the differential gain varies depending on the position of the mirror, wherein the position detector determines the position of the mirror by variations in capacitance between the mirror and the substrate and, wherein the mirror is controlled using sliding mode control to adjust the mirror so that it achieves the desired deflection angle according to the following relationship $e(t)=s(t)-u(t)-\lambda(du(t)/dt)$.

8. The MEMS micro mirror of claim 7 wherein λ is selected to be one value when a distance between a desired position and an actual position is large and is selected to be a different value when the distance between the desired position and the actual position is small.

9. The MEMS micro mirror of claim 8 wherein λ is selected to be a higher value when the distance between the desired position and the actual position is large and is selected to be a lower value when the distance between the desired position and the actual position is small.

10. The MEMS micro mirror of claim 9 wherein the mirror position is controlled by varying the pulse duration of the voltage that is applied to the electrodes.

11. The MEMS micro mirror of claim 10 wherein the detector operates a system during a detector mode, and the drive operates in a drive mode, the detector and drive each comprise the same electrodes, and the controller alternates between the detection mode and a drive mode.

12. A MEMS device including a movable component comprising:

a position detector that determines the position of the movable component, a controller that implements a sliding mode control process to move the movable component to a desired position wherein the sliding mode control is implemented according to the following relationship:

$$e(t)=s(t)-u(t)-\lambda(du(t)/dt)$$

where e(t) is the error signal, s(t) is the desired deflection angle, u(t) is the angle readout, and λ is a selected value that varies according to the distance the set position of the mirror and the actual position of the mirror.

13. The MEMS device of claim 12 wherein λ is selected to be one value when a distance between a desired position and an actual position is large and is selected to be a different value when the distance between the desired position and the actual position is small.

14. The MEMS device of claim 13 wherein λ is selected to be a higher value when the distance between the desired position and the actual position is large and is selected to be a lower value when the distance between the desired position and the actual position is small.

15. The MEMS device of claim 14 wherein the controller varies pulse duration of the voltage to move the moveable component.

16. The MEMS device of claim 15 wherein the controller operates using multi-varied voltage increments.

17. The MEMS device of claim 15 wherein the controller operates using phases of different width.

* * * * *